3,323,883
GEL COMPOSITIONS
Bruce W. Hotten, Orinda, Calif., assignor to Chevron Research Corporation, a corporation of Delaware
No Drawing. Filed Aug. 30, 1963, Ser. No. 305,846
3 Claims. (Cl. 44—7)

This invention relates to gelling agents and gelled hydrocarbon compositions which are prepared therefrom. More particularly, the invention concerns novel hydroxy aluminum soaps prepared from petroleum-derived acids, which soaps possess highly desirable gelling characteristics.

It is known that liquid hydrocarbons may be thickened to produce useful gels by the addition of sodium and aluminum soaps of fatty acids or mixtures of fatty acids and naphthenic acids. These types of gelling agents have found wide use in applications where it is desirable to have a thickened liquid or semi-solid fuel such as in incendiary bombs, flame throwers, etc. Widely used thickeners are those of the napalm type, the composition of which is established as basic aluminum soaps of a blend of about 50% coconut oil acids (primarily lauric acid), 25% oleic acid, and 25% naphthenic acid. While these and other related types of thickeners perform satisfactorily in many applications, certain inherent difficulties lie in the attempted use of these compounds for purposes in which high consistencies and melting points are desired. Thus, it is necessary to be highly selective in the use of fatty acids in these compounds, the more common fatty acids, stearic, oleic and palmitic acids failing to impart proper gelling characteristics to the compositions. In addition, it has been found to be impossible to produce from the fatty acid soaps, gels that melt at sufficiently high temperatures to allow their advantageous use in applications such as fire starters in home barbecues and fireplaces.

It has now been found that hydrocarbon gels possessing desirable consistency and melting point characteristics can be produced by addition to a liquid hydrocarbon base of a minor proportion of a hydroxy aluminum soap containing in relation to the atoms of aluminum, from 1.4 to 1.95 equivalents of naphthenic acid and from 0.05 to 0.6 equivalent of at least one aromatic carboxylic acid selected from the group consisting of isophthalic and terephthalic acids.

The gelling characteristics of these soaps vary with the composition, i.e., the proportion of acid molecules within the soap, and with the concentration of compound which is added to the base hydrocarbon. Thus, by varying the concentration, gels of suitable viscosity and melting point for selected uses can be produced. Gels of relatively low viscosity are of especial use in such applications as the clearing of brush and waste timber from logged land. The gels may be sprayed onto the brush, ignited, and the fires more easily controlled than with liquid fuels. On the other hand, for such uses as lighting of charcoal fires and fireplace fires, gels of high viscosity and high melting point are desirable. These may be handled easily, can be scooped from a suitable container in small portions, and will not melt before the fire is well started and run down in the grates of charcoal burners such as commonly used hibachis or onto fireplace hearths.

A preferred compound for the purposes of producing gels useful for home fire starters is an aluminum soap containing 1.75 equivalents of naphthenic acid and 0.125 equivalent each of isophthalic and terephthalic acids. This soap, when employed in a hydrocarbon thinner boiling between about 345° and 400° F., produces a gel of smooth consistency, high melting point, with no bleeding. "Bleeding" herein means separation of fuel oil base from the gel upon ageing.

The gelling agents of this invention can be prepared by any suitable method; however, a double decomposition process is preferred. Again, the gelling agent may be prepared in situ, that is, using a fuel which is to form the gel base as a solvent in the preparation. The following examples typify the preparation; however, they are not intended to be limiting of the invention.

EXAMPLE I

*Solution A*

6810 g. (61.4 equivalents) of $Al_2(SO_4)_3 \cdot 18H_2O$ and 4990 g. (62.5 equivalents) of $AlCl_3 \cdot 6H_2O$ were dissolved with stirring in 20,000 g. of $H_2O$.

*Solution B*

4800 g. (120 equivalents) of NaOH, 17,400 g. (70 equivalents) of naphthenic acid, and 415 g. each (5 equivalents) of isophthalic and terephthalic acids were dissolved in 30,000 g. of $H_2O$.

Solution A was added to Solution B with stirring at room temperature. The resulting precipitate was filtered off and washed with water to remove by-product sodium sulfate. The soap was then dried for a period of about 24 hours under vacuum at 200° to 250° F. The preparation yielded 21,400 g. of soap.

EXAMPLE II

*Solution A*

540 lbs. (2.1 lb. equivalents) of naphthenic acid, 12.4 lbs. (0.15 lb. equivalent) of each isophthalic and terephthalic acids, and 144 lbs. (3.6 lb. equivalents) of NaOH were dissolved in water to a concentration of about 40% solids.

*Solution B*

400 lbs. of $Al_2SO_4 \cdot 12H_2O$ was dissolved in water to a concentration of about 25% solids.

Solution B was added to Solution A in a mixer and mixed thoroughly. The precipitate was filtered off with suction and the cake was washed with water, then dried in an oven at about 27 inches Hg vacuum for a period of 19 hours at about 140° F. The resulting product gave a 16% ash residue and contained some sodium sulfate.

EXAMPLE III 1142 g. of the product of Example II was soaked in an equal weight of diesel oil. 13.740 g. more diesel oil was added and the mixture was stirred for a period of 7 hours through an extrusion valve at 100–200 p.s.i. pressure drop in a 40-pound grease kettle. The maximum temperature reached was 128° F. The gel was then milled at 5000 p.s.i. through a homogenizer.

In order to determine the effectiveness of various gels of this invention, gelled hydrocarbons were prepared and tested for burning ability and "melt down" in a hibachi, which is a cast iron cooking grill which is ordinarily fueled with charcoal. In the test a 15 gram sample of each gel was placed on the hibachi grate which has ½ inch square holes. Charcoal briquettes were placed on the grate and the sample was lighted. The samples that melted ran through the grate into the ash pit of the hibachi and were essentially ineffective in fire starting. The materials that did not melt or only partly melted did an excellent job of igniting the briquettes. The results of this test are embodied in Table II. In addition, the dropping point of each composition is included and a description of the texture or consistency of each gel is set forth. Each soap was present in the amount of 10% by weight in a light petroleum thinner which boils in the range of about 345° F. to 400° F. The naphthenic acid employed in each example was a commercial grade product having an equivalent weight of about 250.

TABLE I

| Soap at 10% by Weight (equivalent of acid) | Hibachi Test | Texture | Dropping Point, °F. |
| --- | --- | --- | --- |
| HOAl laurate (1.1) oleate (0.40) naphthenate (0.50) | Melted down | | |
| HOAl laurate (1.3) oleate (0.33) naphthenate (0.33) | do | | |
| HOAl laurate (1.0) oleate (0.33) naphthenate (0.33) benzoate (0.33) | do | | |
| HOAl laurate (1.0) oleate (0.35) naphthenate (0.35) isophthalate (2.30) | Partial melt down | | |
| HOAl naphthenate (2.0) | Ran down | Tacky | (¹) |
| HOAl naphthenate (1.67) benzoate (0.33) | Partial melt down | Crumbly | 345 |
| HOAl naphthenate (1.75) adipate (0.25) | Melted down | Gelatinous | 303 |
| HOAl naphthenate (1.75) phthalate (0.25) | do | Rubbery | (¹) |
| HOAl naphthenate (1.75) isophthalate (0.25) | No melt down | Elastic | 580+ |
| HOAl naphthenate (1.75) terephthalate (0.25) | do | Gelatinous | 580+ |
| HOAl naphthenate (1.75) isophthalate (0.125) terephthalate (0.125) | do | Smooth | 538 |

¹ Room.

Thus, the above data show that gels produced from soaps containing the aromatic dicarboxylic acids of this invention in combination with naphthenic acid have melting points sufficiently high to allow their use as fire starters. By contrast, the gels produced from fatty acid soaps are relatively ineffective as they will melt and run into the bottom of the ash grate and thus fail to burn a sufficient length of time to light the charcoal. The gels which did not melt burned for a period of about ten minutes, ample time to start a charcoal fire.

It was found that for the purposes of producing a high melting gel suitable for home use as described above, that the use of a commercial naphthenic acid with an equivalent weight in the range of 200 to 280 with a relatively low content of unsaponifiable material was desirable. The effect of variation of naphthenic acid type in a 10% aluminum naphthenate-isophthalate gel is shown in Table II. Each gel contained 10% by weight of soap in a petroleum thinner boiling in the range of about 345° to 400° F. The hibachi test and texture are as described above.

TABLE II

| Naphthenic Acid Equivalent Weight | Naphthenate: Isophthalate Equivalent Ratio | Texture | Hibachi Burning Test |
| --- | --- | --- | --- |
| 244 | 5:1 | Elastic | No melt down. |
| 244 | 6:1 | do | Do. |
| 265 | 5:1 | Gelatinous | Do. |
| 320 | 5:1 | do | Melted down. |
| 320 | 6:1 | Semifluid | Do. |
| 602 | 3:1 | do | Runs down unburned. |
| 602 | 6:1 | Fluid | Do. |

Any suitable liquid petroleum fuels may be used as a base for the gels of this invention. However, for home and barbecue use a fuel that is relatively odorless is to be preferred. For uses such as starting waste disposal fires and brush clearing fires, heavier, less highly refined fuels may be used in order to reduce cost. Examples of typical fuel bases which may be utilized are turbine fuels, diesel type fuels, jet fuels such as JP-4, etc. In general, liquid hydrocarbons boiling in the range of from about 100° to 600° F. are suitable bases.

In addition to their particular utility as thickening agents for hydrocarbon fuels, the soaps of this invention are useful as flatting agents for surface coating materials, as waterproofing and fungistatic agents for fabrics, as hardening agents and as thickening agents in paints and inks, etc.

What is claimed is:

1. A gelled fuel composition consisting essentially of a hydrocarbon fuel base boiling in the range of 100° to 600° F. and as a gelling agent, in an amount sufficient to produce proper consistency and melting point, a hydroxy aluminum soap wherein the acids used in forming said soap consist essentially of naphthenic acid and at least one aromatic dicarboxylic acid selected from the group consisting of isophthalic and terephthalic acids, said acids being employed relative to atoms of aluminum in quantities of from 1.4 to 1.95 equivalents of naphthenic acid and from 0.05 to 0.6 equivalent of said aromatic acid.

2. The fuel composition of claim 1, wherein the naphthenic acid has an equivalent weight of from about 200 to 300.

3. The fuel composition of claim 2, wherein the hydroxy aluminum soap is derived from about 1.75 equivalents of naphthenic acid, about 0.125 equivalent of terephthalic acid and about 0.125 equivalent of isophthalic acid.

References Cited

UNITED STATES PATENTS

| | | |
| --- | --- | --- |
| 2,763,621 | 8/1956 | Shulman. |
| 2,922,799 | 1/1960 | Baumgartner. |
| 3,002,926 | 10/1961 | Bergen _____ 252—35 |
| 3,082,233 | 3/1963 | Biggart. |

DANIEL E. WYMAN, *Primary Examiner.*

C. F. DEES, *Assistant Examiner.*